(12) United States Patent
Gorday et al.

(10) Patent No.: US 7,277,457 B2
(45) Date of Patent: Oct. 2, 2007

(54) SYNC BURSTS FOR FREQUENCY OFFSET COMPENSATION

(75) Inventors: Paul E. Gorday, West Palm Beach, FL (US); Edgar Herbert Callaway, Jr., Boca Raton, FL (US); Frederick L. Martin, Plantation, FL (US); David B. Taubenheim, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 311 days.

(21) Appl. No.: 10/678,416

(22) Filed: Oct. 3, 2003

(65) Prior Publication Data

US 2005/0074036 A1 Apr. 7, 2005

(51) Int. Cl.
*H04J 3/06* (2006.01)

(52) U.S. Cl. .................. 370/509; 370/480; 375/240.28

(58) Field of Classification Search ................ 370/311, 370/509, 208, 513, 512, 514, 335, 342, 441, 370/347, 480, 510, 511, 477; 455/574, 192.1, 455/182.1, 182.3, 192.3, 343.1, 208, 265; 375/354, 356, 355, 240.28; 340/7.32
See application file for complete search history.

(56) References Cited

U.S. PATENT DOCUMENTS

| | | | |
|---|---|---|---|
| 5,561,665 A | | 10/1996 | Matsouka et al. |
| 5,930,243 A | * | 7/1999 | Parish et al. ................. 370/334 |
| 6,473,607 B1 | * | 10/2002 | Shohara et al. ........... 455/343.1 |
| 6,480,555 B1 | * | 11/2002 | Renard et al. ............... 375/340 |
| 6,522,696 B1 | * | 2/2003 | Mobin et al. ................ 375/262 |
| 6,823,031 B1 | * | 11/2004 | Tatem, Jr. .................... 375/376 |
| 6,862,297 B1 | * | 3/2005 | Gardner et al. ............. 370/503 |
| 6,876,675 B1 | * | 4/2005 | Jones et al. .................. 370/509 |
| 6,907,028 B2 | * | 6/2005 | Laiho et al. ................. 370/347 |
| 6,930,989 B1 | * | 8/2005 | Jones IV et al. ............ 370/335 |
| 7,206,597 B2 | * | 4/2007 | Sudo .......................... 455/522 |
| 2002/0186710 A1 | * | 12/2002 | Alvesalo et al. ............ 370/468 |
| 2004/0067741 A1 | * | 4/2004 | Fei et al. .................. 455/192.1 |

FOREIGN PATENT DOCUMENTS

| | | |
|---|---|---|
| EP | 1235401 A1 | 8/2002 |
| WO | WO 02/32067 A1 | 4/2002 |

* cited by examiner

*Primary Examiner*—Edan D. Orgad
*Assistant Examiner*—Chuong Ho (57) ABSTRACT

A method (500) and system for compensation of frequency offset between a first transceiver (102) and a second transceiver (104) in wireless communication are disclosed. The compensation of the frequency offset between two or more transceivers (102, 104) is achieved using frequency synchronization bursts. These bursts contain information about the frequency offset. The frequency synchronization bursts are transmitted by the first transceiver at a range of frequencies above and below its carrier frequency (502). A second transceiver that receives at least one of these bursts (504) determines the frequency offset (504), and adjusts its frequency to match the frequency of the first transceiver (508). Thereafter, the second transceiver may enter a low power sleep mode (510) in order to reduce its power consumption. The second transceiver returns to active mode (512) just before the start of the transmission of the data packets (514).

19 Claims, 7 Drawing Sheets

SYNC BURSTS FOR FREQUENCY OFFSET COMPENSATION

This invention was made with United States Government support under Agreement No. N66001-03-1-8901 awarded by DARPA. The United States Government has certain rights in the invention. Any opinions, findings, and conclusions or recommendations expressed in this application are those of the authors and do not necessarily reflect the view of the Naval Warfare System Center.

FIELD OF THE INVENTION

The present invention relates to wireless communication systems. More particularly, the invention provides a method and system for frequency offset compensation in wireless communication systems. The invention may also be extended to wireline systems employing bandpass communications.

BACKGROUND OF THE INVENTION

Over the past few decades, there have been significant advancements in the field of wireless communication. Wireless technology has found applications in a variety of areas such as telephony, control of industrial devices, entertainment and many more. Some common examples of wireless communication systems include mobile phones, cordless phones, pagers, and wireless LANs.

Wireless communication systems typically involve the use of transmitters and receivers for the transmission and the reception of data signals respectively. The data signals are embedded in a carrier wave. The carrier wave is typically a sinusoid whose oscillation frequency is referred to as the carrier frequency. The carrier wave is modulated at the transmitter end according to certain characteristics of the data signal. During modulation, a particular characteristic, such as amplitude or frequency, of the carrier wave is varied according to the data signal. The carrier wave, which is modulated using the data signals, is termed as a modulated carrier wave. The modulated carrier wave is demodulated at the receiver end to recover the original data signals. Thus, the data signals are exchanged between the transmitter and the receiver.

For effective exchange of data signals in a wireless communications system, it is imperative that both the transmitter and the receiver operate at the same carrier frequency. Consistency of frequency is ensured by using frequency references in devices such as transmitters and receivers. A frequency reference is an oscillator that produces a standard frequency, from which the one rating frequencies of the receiver and the transmitter are derived. Typically, a frequency reference is implemented using a piezo-electric crystal. Other types of frequency references, including those constructed of integrated circuit elements such as resistors, inductors and capacitors, tend to be less accurate and less expensive than the crystal-based references. In general, the reference elements in the transmitter and the receiver are different and produce slightly different frequencies. Even if the transmitter and the receiver reference elements are of similar design, they may produce different frequencies or vary over time due to manufacturing variation and environmental factors such as temperature, vibration, and aging. This leads to a mismatch between the carrier frequencies at which the transmitter and the receiver operate. This mismatch is termed as frequency offset. The frequency offset between the transmitter and the receiver is a major hindrance in achieving efficient exchange of data signals between the two devices. The frequency offset needs to be compensated in order to improve the quality of wireless communication.

The usage of crystal frequency references at both the transmitter as well as the receiver ends presents an adequate technical solution to the problem of controlling the frequency offset. However, the large size and high cost of piezo-electric crystals are undesirable. The high cost of frequency reference is a limitation especially in low-cost, battery-powered communications equipment designed for sensing and logistics applications.

There exist a number of techniques dealing with frequency offset in wireless communication. In one known technique, an initial estimate of the frequency is obtained using a time average of either phase or correlation samples of a data packet preamble, the data packet being a collection of a fixed number of data bits. This method also estimates the frequency during the transmission of the actual data packet. Hence, an estimate of the frequency offset is obtained.

Another known technique teaches a method for automatically correcting the frequency at the receiver in order to nullify the frequency offset during the exchange of data bits. The frequency offset is estimated using a training sequence. The receiver has the knowledge of the training sequence but not that of the data bits. The frequency correction is achieved by back-rotating the received data bits by the frequency offset estimate. The training sequence is also back rotated by the frequency offset estimate. A second estimate of the frequency offset is obtained using the corrections in the frequency of the data bits as well as the training sequence. The second frequency offset estimate is used to further correct the frequencies of the data symbols.

An automatic frequency compensation apparatus is also known. This apparatus determines a correlation between a baseband signal and a predetermined signal. The baseband signal is the actual data signal that is transmitted. When the correlation exceeds a reference value, the apparatus effects the frequency offset compensation to the baseband. An equalizer is used after the frequency offset compensation. The frequency offset can further be predicted using the output of the equalizer. The prediction is also effected during the training period when the correlation exceeds the reference value.

While the above cited techniques and apparatus deal with the frequency offset problem, the receivers described in these publications require a large bandwidth. The requirement for a large bandwidth exists because the receivers have to process the received signal and also a range of offset frequencies. This results in an undesirable degradation in the receiver sensitivity.

There also exist other methods for achieving frequency offset compensation. For example, in Direct Sequence Spread Spectrum (DSSS) type of modulation, Differential Chip Detection (DCD) can mitigate frequency offset of the order of 10 to 30 percent of chip rate. DSSS is a modulation technique utilizing a digital code sequence having a coded bit rate, or chip rate, much higher than the information signal bit rate. Data signals are transmitted as a collection of a number of data bits. Each data bit consists of a number of code bits, or chips. In DCD, each chip is processed differentially with respect to previous chips. The frequency offset can be mitigated to a certain extent because the time difference between the chips is short. While this technique is more efficient in trading the frequency offset tolerance for receiver sensitivity than other techniques, there is a trade-off in the bandwidth of the spread signal that must be applied to mitigate a given amount of frequency offset. Further, the signal bandwidth is often constrained because of regulatory considerations. Thus, this technique is limited in its effectiveness in mitigating the frequency offset by the available bandwidth of the signal. Also, the higher chip rates imply increased power and complexity, which is undesirable in low-cost, battery powered communications hardware.

From the above discussion, it is evident that there exists a need for a technique that compensates large frequency offsets while minimizing degradation in the receiver sensitivity. The technique should minimize the power dissipation and the complexity in the receiver and the transmitter. The technique should mitigate the frequency offset but should not increase the size and cost of the receiver and the transmitter.

SUMMARY

The present invention provides a method and system for compensating the frequency offset between a transmitter and a receiver. The transmitter and the receiver communicate in order to exchange data packets. The method involves transmission of a plurality of frequency synchronization bursts by the transmitter. Each burst is transmitted at a known offset in frequency from the carrier frequency, at which the data packets are transmitted. The burst contains information that indicates its frequency offset from the following data packets. The receiver receives at least one of the frequency synchronization bursts. The receiver adjusts its frequency in order to match the transmission frequency of the data packets. Thereafter, the receiver may switch to a low power sleep mode until the beginning of the transmission of data packets. The receiver switches back to active mode just before the transmission of data packets from the transmitter. The receiver receives the data packets at the adjusted frequency of the receiver. Thus, the frequency offset between the transmitter and the receiver is mitigated.

BRIEF DESCRIPTION OF THE DRAWINGS

The various embodiments of the invention will hereinafter be described in conjunction with the appended drawings provided to illustrate and not to limit the invention, wherein like designations denote like elements, and in which.

DESCRIPTION OF VARIOUS EMBODIMENTS

For convenience, terms that have been used in the description of various embodiments are defined below. It is to be noted that these definitions are given merely to aid the understanding of the description, and that they are, in no way, to be construed as limiting the scope of the invention.

Frequency offset: The difference between the carrier frequencies, at which a transmitter and receiver operate in order to exchange data between themselves, is termed as frequency offset.

Frequency reference: An oscillator that produces a standard frequency for operation of a device is termed as frequency reference.

Time and Frequency Position: The relative position in time and frequency of a frequency synchronization burst with respect to data packets being transmitted and received between devices is termed as time/frequency position of that burst.

Receiver operating frequency: The carrier frequency at which the receiver attempts to receive the transmitted carrier wave is termed as receiver operating frequency. This is the receiver's expected value of the transmitter carrier frequency.

Integrated circuit frequency reference: The frequency reference that is based on integrated circuit technology is termed as integrated circuit frequency reference.

Crystal based frequency reference: The frequency reference that uses a piezoelectric crystal for generation of a standard frequency is termed as crystal based frequency reference.

Carrier frequency: The frequency of the carrier wave, which is used to transmit data from one device to another, is termed as carrier frequency. The carrier wave is modulated using the data to be transmitted.

Data packet: In data communication, a sequence of binary bits, including data and control signals, that is transmitted as a composite whole, is termed as data packet.

DSSS: Direct Sequence Spread Spectrum (DSSS) is a signal modulation technique in which the data signal is multiplied by one or more pseudorandom sequences prior to carrier wave modulation.

Frequency stability: The invariability of the frequency of a signal with time, under the influence of external factors, is termed as frequency stability.

Frequency Synchronization Burst (FSB): A FSB is a signal produced by the transmitter, which aids the receiver in adjusting to the correct frequency. The FSBs are transmitted before the transmission of the data packet begins.

FSB identification number: A number that uniquely identifies each FSB and may be used by the receiver to infer the relative position, in time and frequency, of the FSB with respect to the data packets.

Sender identification number: A number or code that uniquely identifies the device that is transmitting a FSB or data packet.

Recipient identification number: A number or code that uniquely identifies the device for which a FSB or data packet is intended.

Pattern of transmission of FSBs: The manner, in which FSBs are spread across a frequency range and time duration, is termed as a pattern of transmission of FSBs.

Low power sleep mode: A mode of device operation in which the receiver or the transmitter is not fully active. Some circuits may be active, for example those required for timing and maintaining the frequency stability. However, most circuits essential for transmitting or receiving data are turned off in order to minimize power consumption.

Active mode: The normal mode in which a device transmits or receives data, which usually requires all circuitry associated with transmission or reception to be turned on.

Beacons: Periodic packet transmissions used by a network coordinator to synchronize members of a network are termed as beacons. In networks without network coordinators, individual members may send periodic beacons for identification and possible communication with any devices that may be listening.

Beacon period: The time interval between the transmission of two consecutive beacons is termed as beacon period. The beacon period is also referred to herein as Tb.

Initiating device: A device that initiates the exchange of data packets in a multi-device communication system is termed as an initiating device.

IEEE 802.15.4: It is a set of standards put forth by the Institute of Electrical and Electronics Engineers (IEEE) 802.15 Task Group 4 (TG4). The IEEE 802.15.4 standard relates low data rate, low power, and low complexity solutions for wireless networks.

Zigbee: Zigbee is a non-profit industry consortium comprising semiconductor manufacturers, technology providers, OEMs, and end-users. The Zigbee members define global standards for low cost and low power wireless applications.

Network coordinator: A particular device that controls access or operational behavior of other devices within a communication network.

Figure 1:
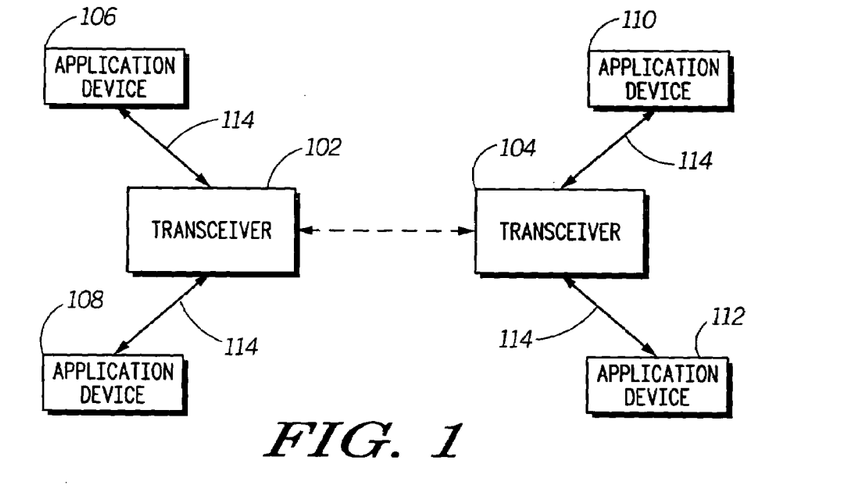
FIG. 1 is a block diagram representing the present invention.

The present invention provides a method and a system for frequency offset compensation in wireless communication systems. FIG. 1 is a block diagram representing the present invention. In an embodiment of the invention, transceivers 102 and 104 exchange data over a wireless medium. Application devices 106, 108, 110, 112 represent other devices that are involved in data exchange with transceivers 102 and 104. The application devices are devices that provide data to be transmitted by the transceiver or respond to data received from the transceiver. Examples of the application devices that provide data to be transmitted include wireless sensors, automation devices, remote controls, memory for stored information and the like. Additionally, the application devices may include actuators or user interface devices, which send acknowledgements or data requests. The wireless sensors and automation devices receive and respond to queries for information, whereas the memory receives an address and responds with the data present at that address. The application devices are connected to transceivers via interfaces 114, which may be implemented in a variety of ways like serial bus, parallel bus or wireless connection.

While FIG. 1 shows a two-way link between transceivers operating in accordance with the present invention. An alternative embodiment, may include a receive-only device, or a receiver, and a transmit-only device, or a transmitter. The transmitter and the receiver may participate in a one-way link with the transmitter transmitting data packets and the receiver receiving them. Also, while FIG. 1 describes a simple link between two transceivers 102, a more extensive network involving more than two devices could be constructed.

Figure 2:
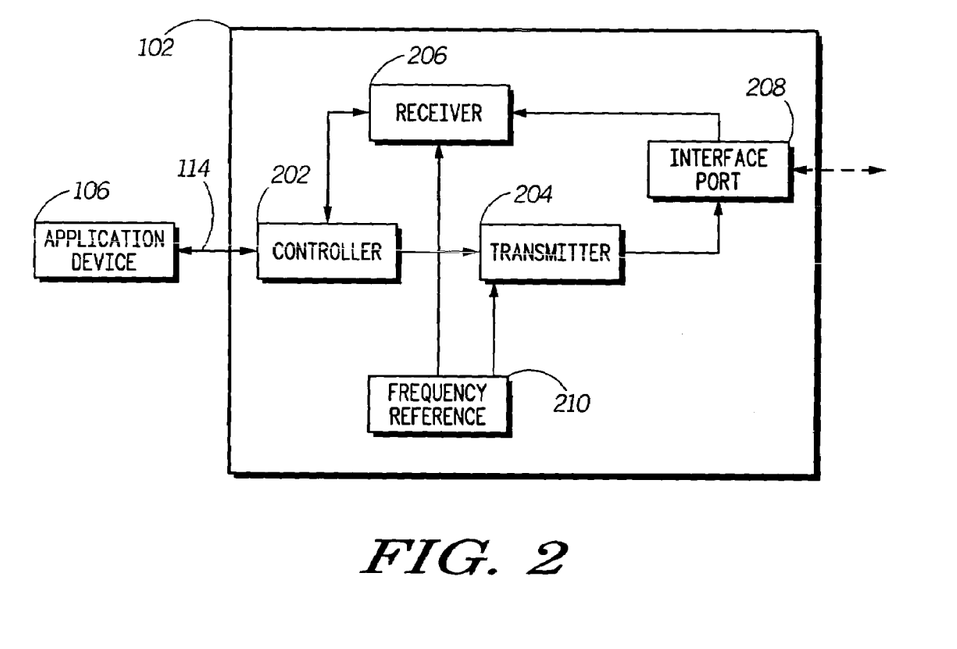
FIG. 2 is a block diagram of a transceiver with a single application device.

FIG. 2 is a block diagram of a transceiver 102 with a single application device 106, in accordance with an embodiment of the present invention. The application device is coupled to a controller 202. Controller 202 is in turn coupled to a receiver 206 and a transmitter 204. Transmitter 204 and receiver 206 are coupled to an interface port 208, which may be an antenna. Transmitter 204 and receiver 206 are also coupled to a frequency reference 210, which facilitates generation of a fixed reference frequency from which the transmitter carrier frequency and the receiver operating frequency are generated. Controller 202, which may be implemented by a microprocessor, may carry out several functions. When transceiver 102 is acting as a transmitter, controller 202 may receive format and code information from the application device. Controller 202 may form the packet, packet header and synchronization burst. Moreover, controller 202 may assign a carrier frequency to a signal to be transmitted and manage the timing and power dissipation of transceiver 102. When transceiver 102 is acting as a receiver; controller 202 may assign operating frequency to receiver 206, decode the received packet, send information to the application device, and manage the timing and the power dissipation of transceiver 102. Transceiver 102 may be implemented as a Direct Sequence Spread Spectrum (DSSS) receiving device or other known wireless receiving device. Transceiver 102 may also be implemented as a DSSS transmitter or other known wireless transmitter.

Figure 3:
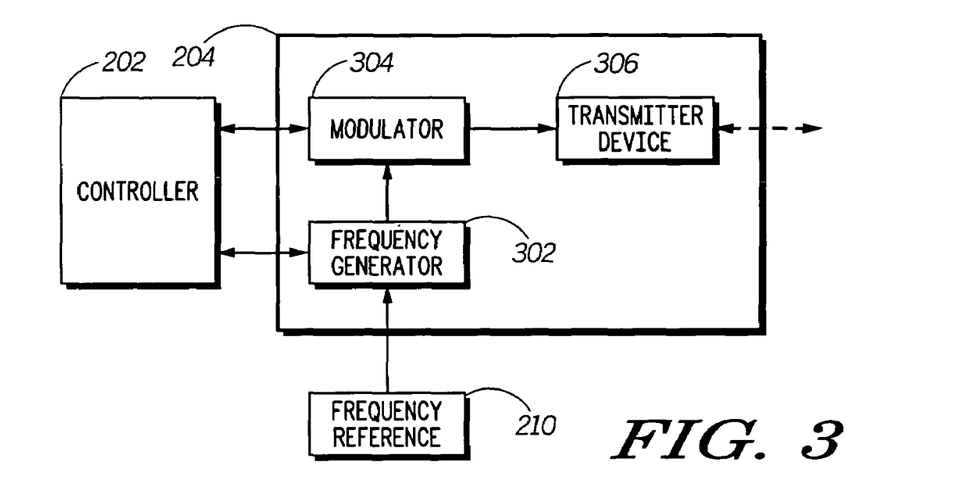
FIG. 3 is a block diagram of a transmitter.

FIG. 3 is a block diagram of transmitter 204, in accordance with an embodiment of the present invention. Transmitter 204 consists of a frequency generator 302, a modulator 304 and a transmission device 306. Transmitter 204 operates by modulating and transmitting data signals received from controller 202. The modulation can be performed using any modulation technique known in the art, such as Bipolar Phase Shift Keying (BPSK). The carrier frequency applied to modulator 304 is derived from frequency reference 210. Frequency reference 210 supplies a fixed-frequency input to frequency generator 302. Frequency generator 302, which may be a phase locked loop (PLL) frequency synthesizer, produces a carrier frequency from among multiplicity of possible frequencies. Controller 202 programs the frequency of the signal produced by frequency generator 302 via signals coupled from controller 202 and frequency generator 302. The carrier frequency generated by frequency generator 302 is applied to modulator 304. The output of modulator 304 is applied to a power amplifier in transmission device 306. The output of the power amplifier is coupled to an air interface port such as an antenna to affect wireless transmission of the data signal.

Figure 4:
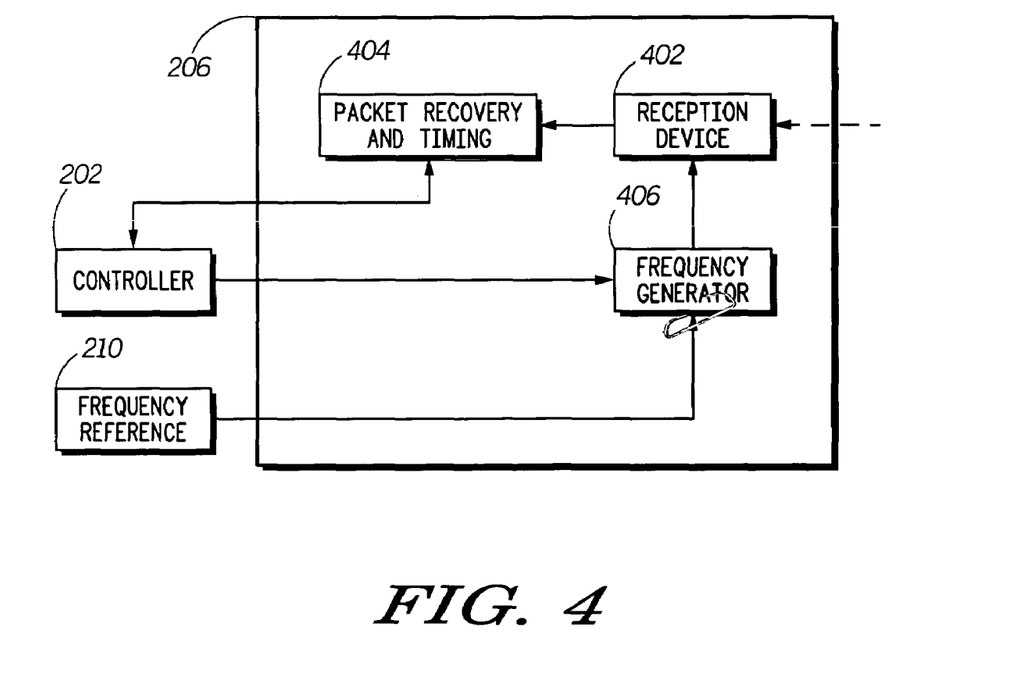
FIG. 4 is a block diagram of a receiver.

FIG. 4 is a block diagram of receiver 206 in accordance with an embodiment of the present invention. Receiver 206 comprises a reception device 402, a packet recovery and timing block 404 and a frequency generator 406. Reception device 402, typically comprising an amplifier and a mixer, receives various data packets and FSBs. The signals received at reception device 402 are amplified and frequency shifted from the carrier frequency to a lower intermediate frequency (IF). The frequency shifting is achieved by combining a Local Oscillator (LO) signal with the received signal. The LO signal is derived from frequency reference 210. Frequency reference 210 supplies a fixed-frequency input to frequency generator 406. Frequency generator 406, which may be a PLL frequency synthesizer, produces the LO frequency from among multiplicity of possible frequencies. The amplified and frequency shifted signals are coupled to packet recovery and timing block 404. In this block, the received data packet is recovered from the modulated signal, and timing of receiver 206 is adjusted to allow synchronization with the incoming signal. The recovered packet is then coupled to a controller 202. Controller 202 distinguishes data packets from FSBs. Controller 202 also separates the data packet from the packet header. In addition, signals from controller 202 are coupled to frequency generator 406 in order to control the frequency of the signal produced. In addition, controller 202 may perform other activities relating to the system including transfer of the data to the application devices.

While the previous discussions on FIG. 2, FIG. 3 and FIG. 4 describe a transceiver 102, transceiver 104 can be regarded as being functionally identical to transceiver 102. Even though the two devices are functionally identical, frequency references 210 in the two transceivers may produce different frequencies due to inherent differences in their manufacturing. Two types of frequency references are known in the art: crystal based frequency references and integrated circuit based frequency references. Crystal based frequency references may be implemented using quartz crystals such as an AT-cut quartz blank. These frequency references are commonly used in cellular phones and other portable communications equipment. Examples of integrated circuit based frequency reference include ring oscillators. Frequency references 210 operate with a frequency stability, which determines the variance in the frequency generated by them.

Figure 5:
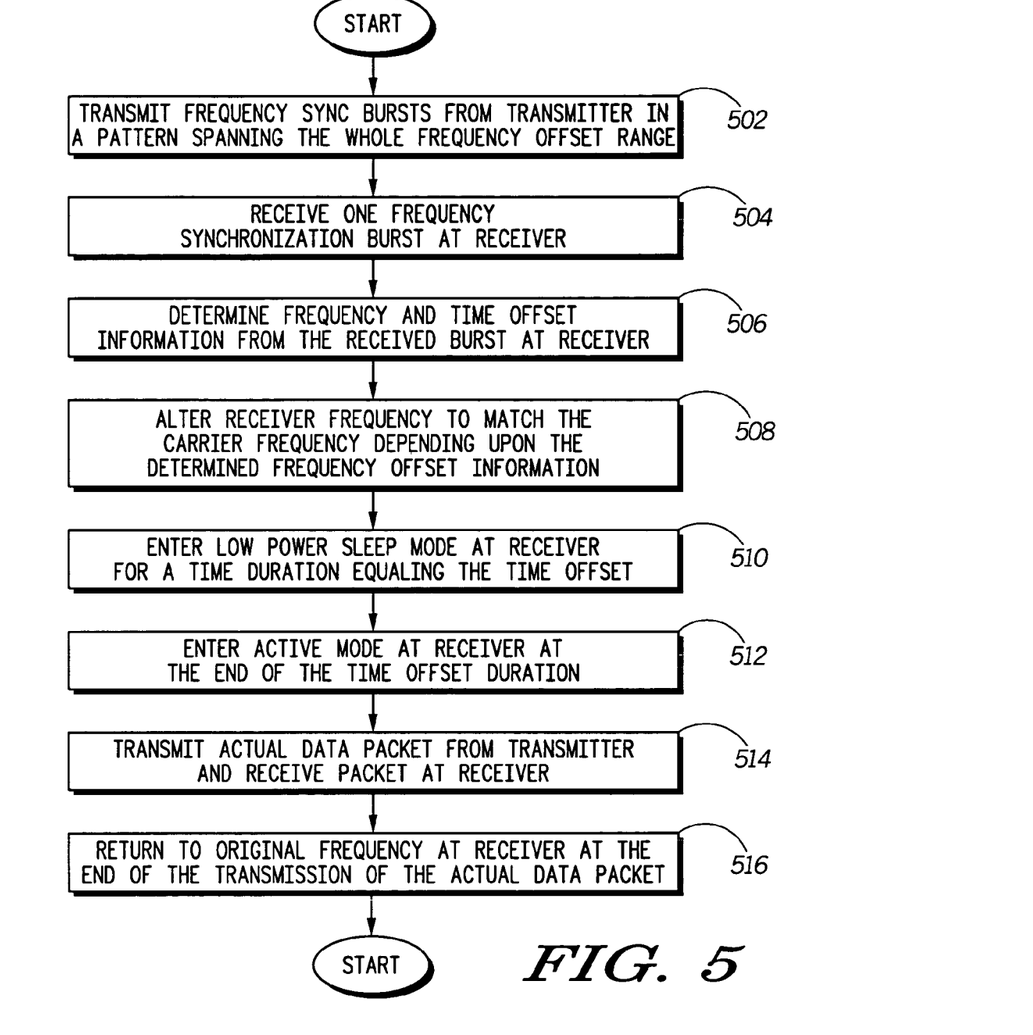
FIG. 5 is a flow chart illustrating the various steps of the present invention.

The frequency offset compensation technique of present invention involves transmission of FSBs by transceiver 102 for compensation of the frequency offset between transceiver 102 and transceiver 104. FIG. 5 is a flow chart illustrating the various steps of the present invention. Transceiver 102, acting as a transmitter, transmits FSBs in a pattern at step 502. The FSBs are distributed across a range of frequencies to span the expected range of the frequency offset. Transceiver 104, acting as a receiver, receives at least one of the FSBs, at step 504. Transceiver 104 receives the FSB that has been transmitted at a frequency sufficiently close to the operating frequency of transceiver 104. Transceiver 104 determines the time and frequency position information from the received FSB, at step 506. The time position information is the time period between the received FSB and the beginning of the data packets associated with the received FSB. The frequency position information is the difference between the frequency at which the FSB was transmitted and the frequency at which the associated data packets will be transmitted. Thus, in order to receive the data packets, transceiver 104 alters its frequency by an amount equal to the frequency position information, at step 508. Now, the frequency of transceiver 104 matches that of transceiver 102. Transceiver 104 goes into a low power sleep mode at step 510. In sleep mode, some circuits may be active, for example those required for timing and maintaining frequency stability, but most circuits essential for receiving data are turned off in order to minimize power consumption. Transceiver 104 maintains the low power sleep mode for a time duration less than or equal to the time offset. When the duration of time offset has elapsed, transceiver 104 returns to active mode at step 512. Transceiver 102 transmits the data packets at step 514. Transceiver 104 receives the data packets at step 516. On completion of the exchange of data packets, transceiver 104 returns to its original frequency at step 518. Alternatively, transceiver 104 may elect to operate at the new frequency. This would be advantageous in cases where additional information in the FSB indicates that the transmitting device has very good frequency stability and should be considered an accurate frequency reference.

FIG. 5 also applies to a broadcast scenario in which a primary communication device, like a transmitter, is sending data packets to multiple secondary communication devices, like receivers. Each of the secondary communication devices may receive a different FSB, depending on its particular frequency offset with respect to the primary communication device. Then each secondary communication device follows steps 506 through 516 in order to receive the data packets.

Figure 6:
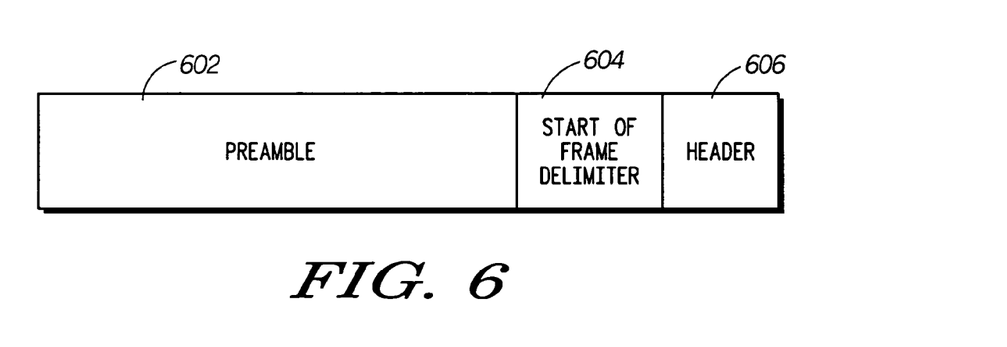
FIG. 6 shows a possible frequency synchronization burst format for the IEEE 802.15.4 standard.

The present invention involves the transmission of FSBs before an exchange of the associated data packets to accurately determine the frequency offset. A FSB is a small data packet containing the information about its relative position with respect to the associated data packets. For example, in case of IEEE 802.15.4 standard, a FSB can be a shortened version of the data packet format specified by the standard. FIG. 6 shows a possible FSB format for the IEEE 802.15.4 standard. This FSB format contains a preamble 602, a start-of-frame delimiter 604, and a header 606. Preamble 602 is 8 symbols in length and is used by the receiving device to acquire time synchronization with the chip and bit waveforms. Start-of-frame delimiter 604 is two symbols long and is used by the receiving device to acquire time synchronization to the start of the data portion of the packet. Header 606 contains one reserved bit and seven bits of information describing the number of bytes of data in the packet. Another possible FSB format would be to use the reserved header bit to indicate whether this packet is a regular data packet or a FSB. The remaining seven bits may represent a compact representation of the time and frequency position information, or they could specify the length of a payload portion of the FSB. The payload portion of the FSB may provide more detailed information on time and frequency position of the FSB with respect to the data packets, as well as device and network identification numbers for the transmitting and/or receiving devices.

The information contained in the FSB may be implicit. For example, each FSB may have a unique FSB identification number assigned to it. Using a FSB identification number minimizes the size of the FSB. However, the relative offset in time and frequency of each FSB, in this case, is a common pre-determined value. For example, ten FSBs may be numbered 1 through 10, with the frequency and time offset values for each FSB being pre-defined and stored in a look-up table at the receiving end. Alternatively, the information contained in the FSB may indicate the relative time and frequency offset as measured in time and frequency units respectively. Value of the frequency and time units, such as 10 MHz steps for the frequency offset and 1 millisecond steps for the time offset, is pre-defined and known at the transmitter as well as the receiver ends. Along with the offset information, the FSB may also contain additional information. This information may include sender identification number, recipient identification number, network identification number, and the like. Inclusion of the additional information is subject to the amount of overhead that can be tolerated by the network.

Figure 7:
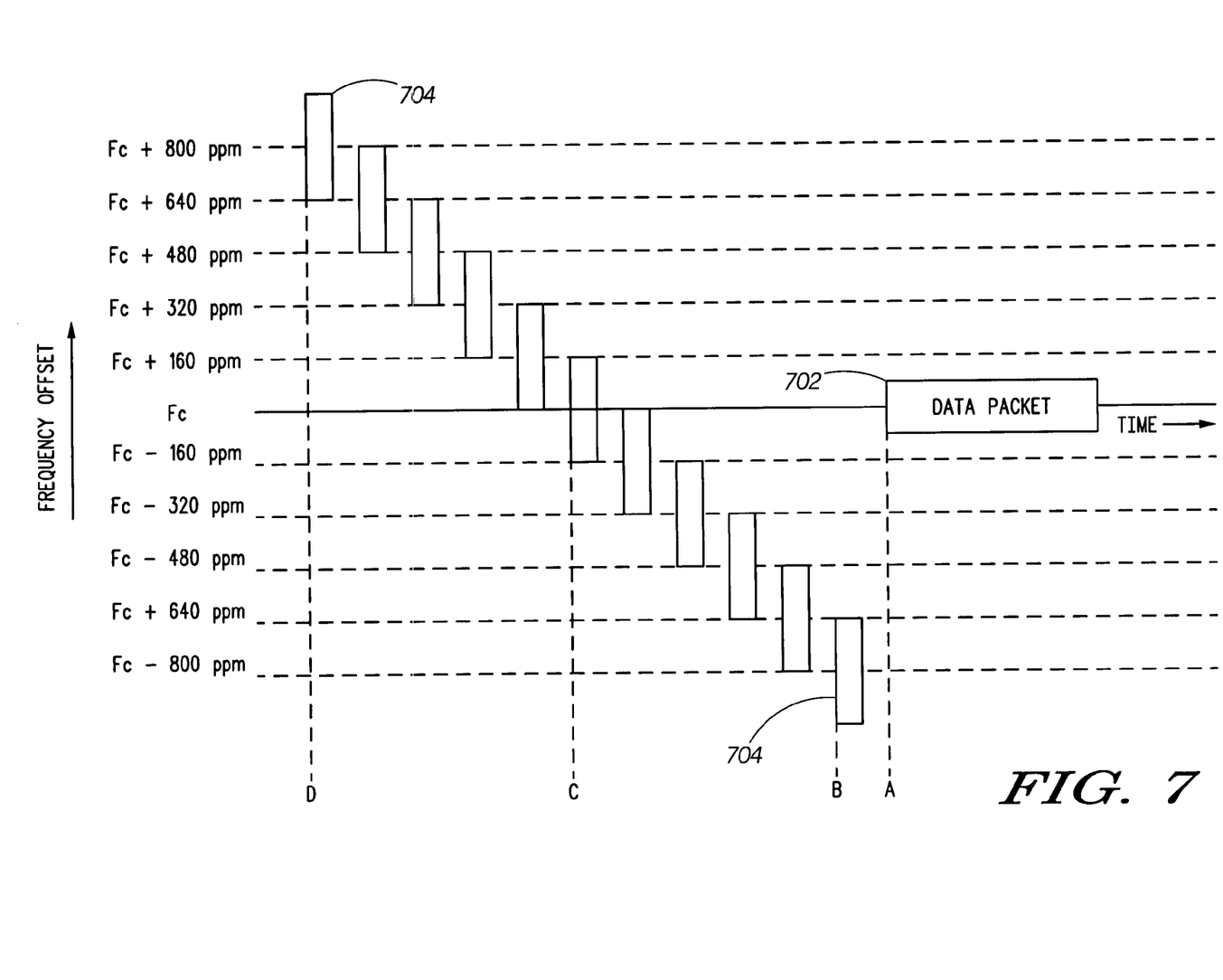
FIG. 7 shows a monotonic pattern for transmission of the frequency synchronization bursts in an IEEE 802.15.4 environment.

Transmission of FSBs for the frequency offset compensation is done in a manner such that the expected range of the frequency offset is covered. One of the ways to achieve this is to transmit FSBs in a suitable pattern. A suitable pattern is formed by distributing FSBs over a frequency range. The pattern also involves transmitting the FSBs at regular intervals of time. The regular time intervals between FSBs ensure that transceiver 102 can generate FSBs for different frequencies. FIG. 7 shows a monotonic pattern for transmission of FSBs in an IEEE 802.15.4 environment. The frequency at which the desired transmission of data packet 702 takes place is indicated by Fc. A sequence of FSBs 704 is transmitted before the transmission of data packet 702. FSBs 704 are spread across a frequency range of 1600 parts per million (ppm), or 0.0016Fc. The first FSB is transmitted at a frequency that is higher than Fc by 800 ppm. Each of the subsequent FSBs is transmitted at a frequency, which is lower by 160 ppm than the frequency at which the FSB preceding it was transmitted. Any active receiver, whose frequency offset is within +/−80 ppm of the frequency of a FSB, is able to capture any one of the FSBs and make appropriate adjustments before data packet 702 is transmitted. This is equivalent to the allowable frequency offset in IEEE 802.15.4 standard. IEEE 802.15.4 standard specifies that for effective exchange of data packets, the stability of frequency reference 210 should not vary by more than 40 ppm. Hence, the worst-case frequency offset, in this case, is 80 ppm. Therefore, the separation between two FSBs is set at 160 ppm. Consequently, a receiver having frequency exactly halfway between two adjacent FSBs can receive either one of them correctly. For example, if a receiver has the frequency offset of +720 ppm relative to Fc, then it can receive either FSB transmitted at Fc+800 ppm, or FSB transmitted at Fc+640 ppm. The pattern of transmission of FSBs shown in FIG. 7 allows transceiver 102 to simply step through a range of frequency offsets for generating FSBs 704 at varying frequencies. Since frequencies of two adjacent FSBs do not differ by a substantial amount, settling time of transceiver 102 while generating FSBs 704 is minimized. After the reception of a FSB, transceiver 104 may enter a low power sleep mode. By entering a low power sleep mode, transceiver 104 practically switches off. Transceiver 104 switches on or enters active mode just prior to the transmission of data packet 702.

The above-mentioned method for frequency offset compensation can be adapted for different types of networks. For example, there are networks that use beacons for frequency synchronization. The beacons are periodic packet transmissions used by a network coordinator to synchronize members of a network. They can also be used in networks without a coordinator. In the latter case, each member sends periodic beacons for identification and possible communication with any devices that may be listening. In many low-cost devices, frequency reference 210, used to derive the carrier frequency at the transmitter as well as receiver ends, is also used to derive timing for the periodic beacon transmissions. In such cases, there is a level of the frequency offset and variations in the time interval between beacons. The time interval between transmissions of two beacons is termed as beacon period. When using FSBs prior to each beacon, the relative time offset of each FSB can be made a function of the beacon period. FIG. 7 also illustrates this timing relationship. The transmission of data packet 702 starts at time instance A. The lowest-frequency FSB 704 starts at a fixed time instance B before data packet 702. The start time for any other FSB is computed as the product of the beacon period, Tb, and the frequency offset (in ppm) of the FSB relative to the lowest frequency FSB. For example, the first FSB has a carrier frequency that is 1600 ppm higher than the last FSB, so the first FSB should be transmitted 0.0016Tb prior to the last FSB. All receivers attempt to enter the active mode for the purpose of receiving a FSB at time instance C. The time difference between B and C is equal to 0.0008 times Tb (0.0008 is equivalent to 800 ppm). Receivers having a frequency offset from Fc are likely to wake up earlier or later than C by an amount proportional to Tb and their relative frequency offset in ppm. For example, a receiver whose frequency offset is −800 ppm with respect to Fc has a frequency reference that is oscillating too slowly. A beacon period timer based on this same frequency reference will have a beacon period that is 800 ppm too long, causing the receiving device to enter the active receive mode 0.0008Tb later than expected, which is just in time to receive the FSB at time B. The FSB timing relationship described here minimizes the amount of time that a receiver spends in the active mode while searching for FSBs.

FSBs 704 may span a frequency range that is considerably wider than the data packet bandwidth. To help reduce interference to neighboring frequency channels, special coding may be applied to FSBs 704. Pseudo-noise sequence coding is an example of special coding that can be applied in order to reduce interference. As specified in IEEE 802.15.4 standard, direct sequence spread spectrum (DSSS) is employed at the physical layer for packet transmission. The FSBs may use the same DSSS technique with a different spreading code in order to minimize interference. Such special coding should be apparent to anyone skilled in the art.

Figure 8:
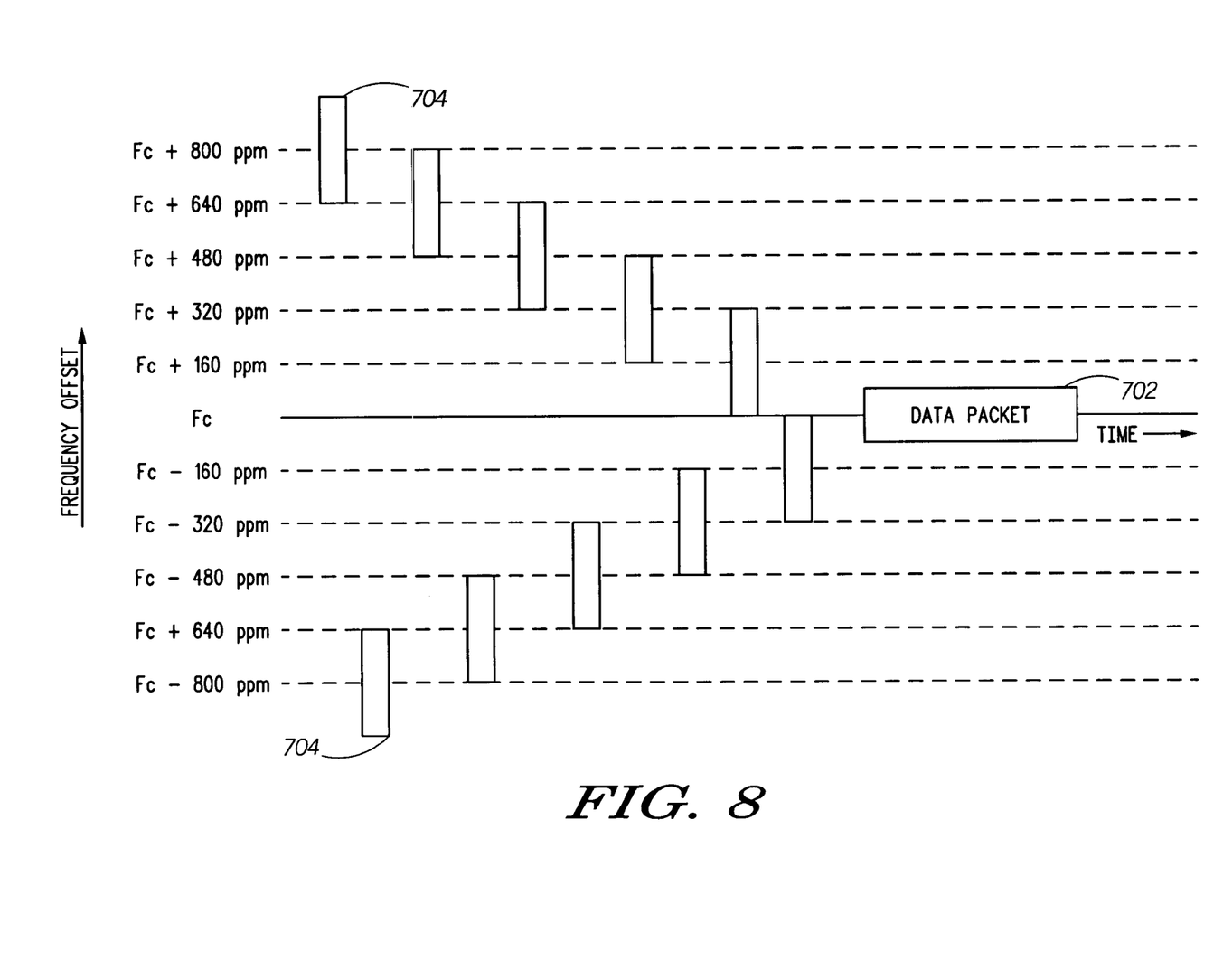
FIG. 8 shows a converging pattern of transmission of the frequency synchronization bursts.

Several alternative patterns of the transmission of FSBs are possible. FIG. 8 shows a converging pattern of the transmission of FSBs. The converging pattern does not require a FSB 704 being transmitted at Fc. In this pattern, devices that have the largest frequency offsets are given the most time to make adjustments in order to receive data packet 702.

Figure 9:
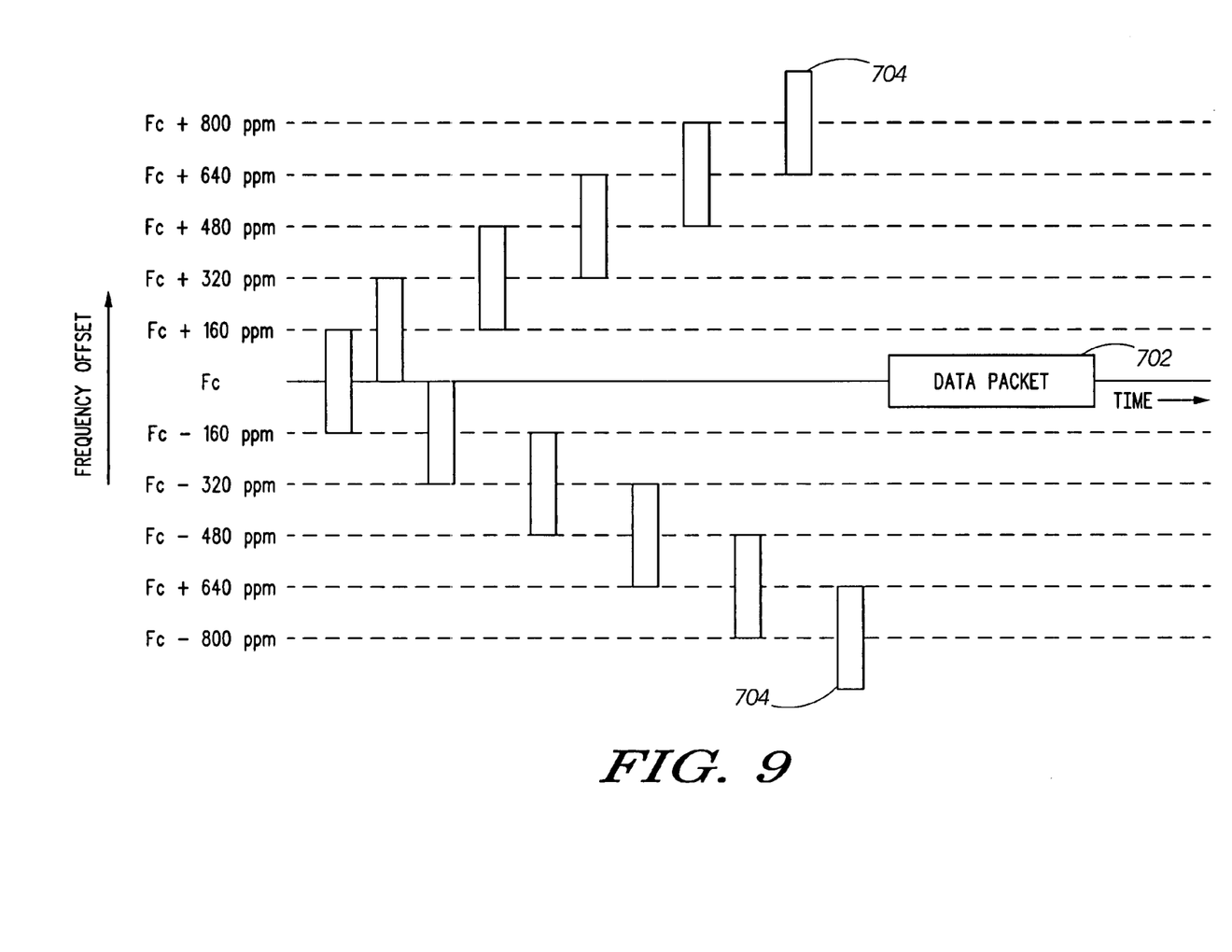
FIG. 9 shows a diverging pattern of transmission of the frequency synchronization bursts.

FIG. 9 shows a diverging pattern of the transmission of FSBs 704. This pattern allows devices with the smallest frequency offset, more time to remain in the low power sleep mode before the arrival of data packet 702. In cases where the frequency offset distribution is normally distributed around Fc, this may minimize the average time duration for which a receiver remains in active mode, when synchronizing in order to receive data packet 704.

Figure 10:
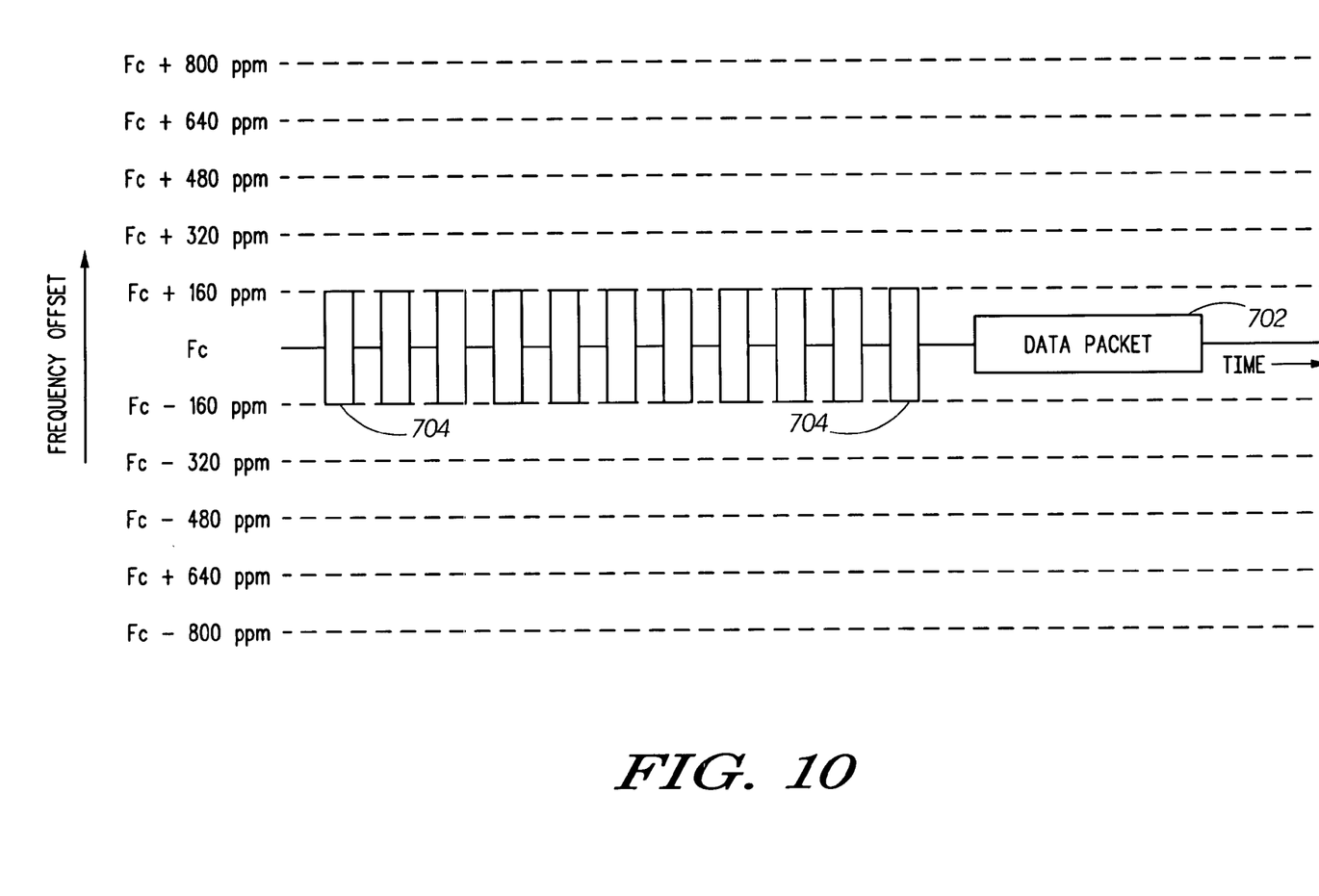
FIG. 10 shows a single-frequency pattern of transmission of the frequency synchronization bursts.

FIG. 10 shows a single-frequency pattern of the transmission of FSBs 704. This pattern requires that the receivers actively search for FSBs 704 over a range of frequency offsets. The advantage of this pattern is that it does not require transceiver 102 to generate FSBs 704 of various frequencies. Usage of this pattern allows the transmitting device to operate closer to the edge of its permitted spectral band and it minimizes interference between the systems on adjacent frequency channels. Due to the single frequency operation, FSBs 704 need not be interleaved with blank time intervals. However, time intervals between FSBs 704 may prove beneficial to receiver search algorithms. For example, the receiving device may search the expected range of frequency offsets by stepping through a set of frequency offsets using a monotonic, converging, or diverging pattern, and at each frequency offset putting the receiving device in active mode for a short amount of time and attempting to detect the presence of a FSB. The guard time between FSB's allows for receiver settling time when changing frequency. The use of the single-frequency FSB pattern is more efficient than simply lengthening the preamble field in the standard IEEE 802.15.4 data packet. The time offset information in each FSB allows a receiver to enter a low-power sleep mode prior to arrival of the data packet, thereby, conserving power for transceiver 104.

In an alternative embodiment of the present invention, it may not be necessary to use the FSBs before each communication session. This is dependent on the type of network in which the present invention operates. For example, in a star network topology, the network relies on coordinator devices that periodically send out beacon packets. In this case, the network coordinator may transmit the FSBs prior to the beacon packets. Other packets like data, commands, and acknowledgements may be exchanged following the beacon packet using the newly acquired frequency information from the FSBs transmitted prior to the beacons.

Another embodiment of the present invention may cater to an exchange of data packets between two or more devices. In this case, the FSBs may only be sent at the beginning of the exchange by the device that initiates this exchange. Other devices may tune their frequencies as close as possible to the frequency of the initiating device before sending any packets. After the packet exchange is complete, the other devices may either continue with their new frequency or return to their original frequency settings. In case of the initiating device being a network coordinator or if it has a good stability, maintaining the new frequency may be preferred. In case of general peer-to-peer communications or devices having poor stability, it may be preferred that the device returns to its original frequency settings.

Furthermore, the frequency offset information, which is determined by each receiving device on receiving a FSB, can be reported back to the transmitting device that sent the FSB. The frequency offset information can also be shared with other devices in the network. This information may be used in a network synchronization algorithm. For example, a network coordinator may gather the frequency offset information from other devices in the network and use the distribution to adjust its own operating frequency. Specifically, the network coordinator may adjust its operating frequency such that the mean or median frequency offset of the other devices is close to zero.

In another embodiment of the present invention, transceivers 102 and 104 may operate in a wireline system employing bandpass communication. In this type of communication, information is modulated onto a carrier wave prior to its transmission. The transmission takes place over a physical medium like copper wire. A number of wireline communication systems, such as telephone modems and cable modems, use bandpass modulation techniques, in which information is modulated onto a carrier. There may exist a carrier frequency offset between the transmitter and the receiver in this case as well. The frequency offset compensation technique of the present invention serves the purpose of eliminating this frequency offset.

The frequency offset compensation technique of the present invention solves the problem of large frequency offsets between the transmitter and the receiver. The transmission of FSBs before the transmission of actual data packets helps in mitigating large frequency offsets, thereby, ensuring effective exchange of data. The FSBs used in the present invention are very small packets and do not add any substantial overhead to the operation of the devices. Conventional methods for frequency offset compensation involve scaling the bandwidth of the signal and transceiver 104. For example, differential chip detection in DSSS type of modulation involves incrementing the rate at which data is transmitted. The present invention does not require any such scaling.

In accordance with the present invention, transceiver 104 is allowed to enter a low power sleep mode after determining the exact start time of the transmission of data packet from transceiver 102. This ensures that there is no wastage of power at transceiver 104 and hence the power consumption is lowered. The low power consumption allows for the use of small size batteries, further reducing the size of transceiver 104. Thus, the compensation technique of the present invention is ideally suitable for applications where size, cost, and power consumption are critical to the performance of the application.

The frequency offset compensation technique of the present invention can be implemented on existing wireless networks without any substantial changes to the network configuration. The present invention can be implemented as a combination of Digital Signal Processing (DSP) chips using Application Specific Integrated Circuit (ASIC) technology.

The frequency offset compensation technique of the present invention is suitable for low-cost and low-rate wireless networks, where frequency stability of the network elements is poor. Applications of the present invention include, but are not limited to, wireless sensors, automation and control devices, tracking devices used in logistics, and entertainment devices such as video games. Industry standards such as IEEE 802.15.4 and Zigbee™ address such applications. Embodiments of the present invention may be incorporated into future versions of these standards to provide improved tolerance of frequency instability and reduced cost of the network device.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for compensation of frequency offset between a first wireless device and a second wireless device, the first wireless device and the second wireless device communicating in order to exchange data packets, the method comprising:

transmitting a plurality of frequency synchronization bursts from the first wireless device to a second wireless device, wherein each frequency synchronization burst from the plurality of synchronization bursts is transmitted at a particular, but differing frequency offset from a center frequency, and each frequency synchronization burst from the plurality of synchronization bursts is transmitted at a particular, but differing frequency offset from other frequency synchronization bursts from the plurality of synchronization bursts, and each frequency synchronization burst contains bits representing frequency position information; and transmitting at the center frequency, one or more data packets to the second wireless device.

2. The method of claim 1 wherein the synchronization bursts also contains bits representing time position information.

3. The method as recited in claim 1 wherein transmitting the plurality of frequency synchronization bursts comprises:

transmitting the plurality of frequency synchronization bursts in a pattern; and transmitting bits representing a frequency position of each frequency synchronization burst relative to the data packets, the bits being transmitted as a part of the frequency synchronization burst, the relative position of the frequency synchronization bursts being predetermined in terms of time and frequency.

4. The method as recited in claim 1 further comprising the step of retaining an adjusted frequency of the second wireless device after the completion of an exchange of packets.

5. The method as recited in claim 1 further comprising transmitting frequency synchronization bursts before a transmission of beacon packets, the transmission of beacon packets being executed by a network coordinator device.

6. The method as recited in claim 1 wherein the frequency synchronization bursts are transmitted in a monotonic pattern.

7. The method as recited in claim 1 wherein the frequency synchronization bursts are transmitted in a converging pattern.

8. A method for compensation of frequency offset between a first wireless device and a second wireless device, the first wireless device and the second wireless device communicating in order to exchange data packets, the method comprising:
  receiving a frequency synchronization burst transmitted at a particular frequency offset from a center frequency and containing bits representing frequency position information for the burst, and
  receiving at the center frequency, one or more data packets.

9. The method of claim 8 wherein the frequency synchronization burst is one burst from a plurality of plurality of synchronization bursts with each burst being transmitted at a particular, but differing frequency offset from the center frequency.

10. The method of claim 8 wherein the synchronization bursts also contains bits representing time position information.

11. The method as recited in claim 8 wherein receiving the plurality of frequency synchronization bursts comprises:
  receiving the plurality of frequency synchronization bursts in a pattern having bits representing a frequency position of each frequency synchronization burst relative to the data packets, the bits being received as a part of the frequency synchronization burst, the relative position of the frequency synchronization bursts being predetermined in terms of time and frequency.

12. The method as recited in claim 8 further comprising receiving frequency synchronization bursts before a reception of beacon packets, the transmission of beacon packets being executed by a network coordinator device.

13. The method as recited in claim 8 wherein the frequency synchronization bursts are received in a monotonic pattern.

14. The method as recited in claim 8 wherein the frequency synchronization bursts are received in a converging pattern.

15. An apparatus comprising:
  a transmitter transmitting a plurality of frequency synchronization bursts from the first wireless device to a second wireless device, wherein each frequency synchronization burst from the plurality of synchronization bursts is transmitted at a particular, but differing frequency offset from a center frequency, and each frequency synchronization burst from the plurality of synchronization bursts is transmitted at a particular, but differing frequency offset from other frequency synchronization bursts from the plurality of synchronization bursts, and each frequency synchronization burst contains bits representing frequency position information for the burst, the transmitter additionally transmitting one or more data packets at the center frequency to the second wireless device.

16. The apparatus of claim 15 wherein the synchronization bursts also contains bits representing time position information.

17. The apparatus of claim 15 wherein the frequency synchronization bursts are transmitted before a transmission of beacon packets, the transmission of beacon packets being executed by a network coordinator device.

18. The apparatus of claim 15 wherein the frequency synchronization bursts are transmitted in a monotonic pattern.

19. The apparatus of claim 15 wherein the frequency synchronization bursts are transmitted in a converging pattern.

* * * * *